(12) United States Patent
Usami

(10) Patent No.: US 6,376,040 B1
(45) Date of Patent: Apr. 23, 2002

(54) OPTICAL INFORMATION MEDIUM, OPTICAL INFORMATION RECORDING METHOD, AND OPTICAL INFORMATION REPRODUCING METHOD

(75) Inventor: Yoshihisa Usami, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/288,811

(22) Filed: Apr. 9, 1999

(30) Foreign Application Priority Data

Apr. 10, 1998 (JP) .......................................... 10-099755

(51) Int. Cl.⁷ ................................................ B32B 3/02

(52) U.S. Cl. ....................................... 428/64.4; 365/234

(58) Field of Search .......................... 428/64.4; 365/234

(56) References Cited

U.S. PATENT DOCUMENTS 5,379,266 A * 1/1995 Russell ........................ 365/234

* cited by examiner

*Primary Examiner*—Eric W. Stamber
*Assistant Examiner*—Donald L. Champagne
(74) *Attorney, Agent, or Firm*—Sughrue Mion, PLLC

(57) ABSTRACT

An optical information medium comprises a substrate 2, a recordable 6 layer which is formed on one surface of the substrate and which has plural data patches, and a lens layer 4 which is formed on another surface of the substrate and comprises the plural lenses for optically reading of respective data of plural data patches when the data patches are illuminated with light. Provided is a new optical information medium wherein the aforementioned structure makes it possible to record data optically for prompt production of a small number of media for debugging and small amount publication, and reproduce the data, using an OROM, which is a next generation optical disk device. Provided are also an optical information recording method and an optical information reproducing method, using the information medium.

20 Claims, 7 Drawing Sheets

OPTICAL INFORMATION MEDIUM, OPTICAL INFORMATION RECORDING METHOD, AND OPTICAL INFORMATION REPRODUCING METHOD

BACKGROUND OF THE INVENTION

1. Field of the Invention

The present invention relates to a new optical information medium, optical information recording method, and optical information reproducing method, and more particularly to a new optical information medium, optical information recording method, and optical information reproducing method which make it possible to write information optically, and to reproduce information by using an OROM (optical read-only memory) which is a next generation optical disk device.

2. Description of the Related Art

In conventional optical disk devices, signals recorded as a track in a spiral form or tracks in the form of concentric circles on a rotating disk are scanned by a single beam such as a laser beam to read the signals. On the other hand, an OROM (optical read-only memory) which has been presented as a next generation optical disk device comprises a data card as an information medium. The data card has many data regions called patches. Each patch is a two-dimensional image containing 32 KB of data. Also, each patch is divided into grid-like blocks. For each of the data patches, an LED (light emitting diode) and a diffractive lens are provided, and recorded data are reproduced by illuminating the data patches with the LEDs, reading the data images which are collected/reflected and projected through the diffractive lenses on a reflective collector lens and redirected onto a CMOS (complementary symmetry metal-oxide semiconductor field-effect transistor) image sensor, and then digitizing the read images and extracting the recorded data. In the OROM, recorded data can be read while the information medium remains stationary. Therefore, access time is considerably short, that is, 10 ms, and the OROM is strong against mechanical shocks and vibrations. Moreover, the lack of moving parts reduces electric power consumption and it is easy to make the device more compact. Due to these features, much is being expected of the OROM as a next generation optical disk device, and in particular, as an optical disk device for embedded systems and portable equipment which require compactness.

However, these device are read-only devices, and information medium proposed for the OROM are also reproduction-only media.

The data card as a reproduction-only information medium for the OROM has on one side a data layer and on the other side a diffractive lens array layer. This data card is made of a polycarbonate resin, and the data layer and the diffractive lens array layer are formed so as to be integral by injection molding or the like. In order to add information to this information medium, a stamper on which a record signal is recorded is first formed. Thereafter, this stamper is placed at to a molding machine, and then a resin is molded therein to form recording areas on the surface of the resin. However, this process is very long, and debugging cannot be carried out rapidly. Additionally, even when a small number of recording media are manufactured, a long process is necessary for the manufacturing. Thus, much time and cost are required.

SUMMARY OF THE INVENTION

An object of the present invention is to provide a new optical information medium which makes it possible to write information optically for rapid debugging or rapid production of a small number of media for small amounts of publication, and makes it possible to reproduce the information by using an OROM which is a next generation optical disk device, and to provide an optical information recording method and an optical information reproducing method using the same.

Focusing on the reading principles of the OROM (optical read-only memory), the present inventors arrived at the present invention.

Namely, an optical information medium of the present invention comprises a substrate, a recordable layer which is formed on one surface of the substrate and which has plural data patches, and a lens layer which is formed on another surface of the substrate and comprises the plural lenses for optically reading of respective data of plural data patches when the data patches are illuminated with light.

It is preferable that a tracking guide is provided at the recordable layer, and recording is carried out by the tracking guide such that the data patches are formed to be divided into grid-like blocks. Further, it is preferable that a means for specifying addresses of the respective blocks is provided on the tracking guide. Moreover, it is preferable that a pitch of the tracking guide is equal to or smaller than a pitch of the respective blocks.

Moreover, an optical information recording method of the present invention comprises the step of irradiating, with recording light, an optical information medium comprising a substrate, a recordable layer which is formed on one surface of the substrate and which has plural data patches, and a lens layer which is formed on another surface of the substrate and comprises the plural lenses for optically reading of respective data of plural data patches when the data patches are illuminated with light, from the recordable layer side so as to record information on the recordable layer. Recording may be carried out while the optical information medium is rotation-driven.

Furthermore, an optical information reproducing method of the present invention comprises the step of irradiating, with reproducing light, an optical information medium comprising a substrate, a recordable layer which is formed on one surface of the substrate and which has plural data patches, and a lens layer which is formed on another surface of the substrate and comprises the plural lenses for optically reading of respective data of plural data patches when the data patches are illuminated with light, from the recordable layer side; and reproducing recorded information by reading transmitted light.

DETAILED DESCRIPTION OF THE INVENTION

Figure 2A:
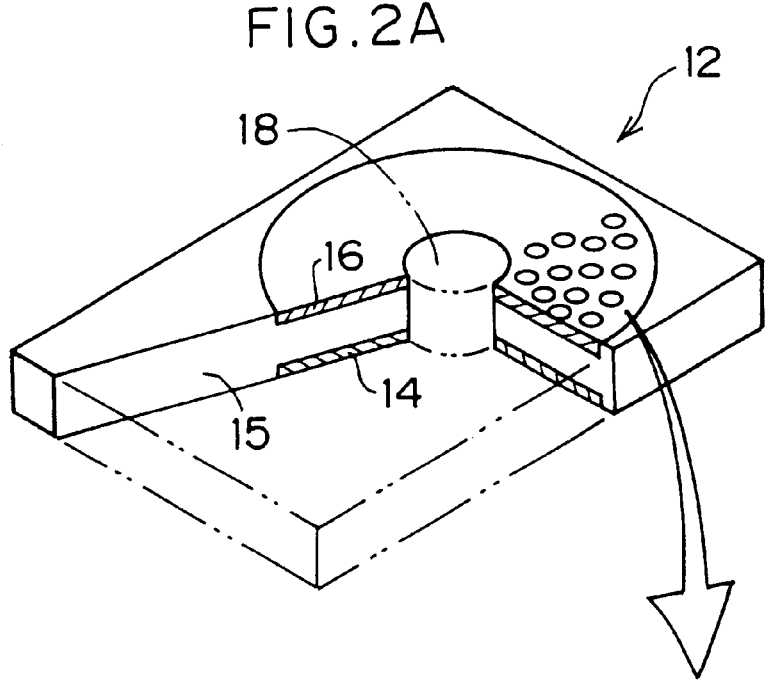
FIG. 2A is a schematic view showing a structure of an optical memory card which is an OROM type information medium.
Figure 2B:
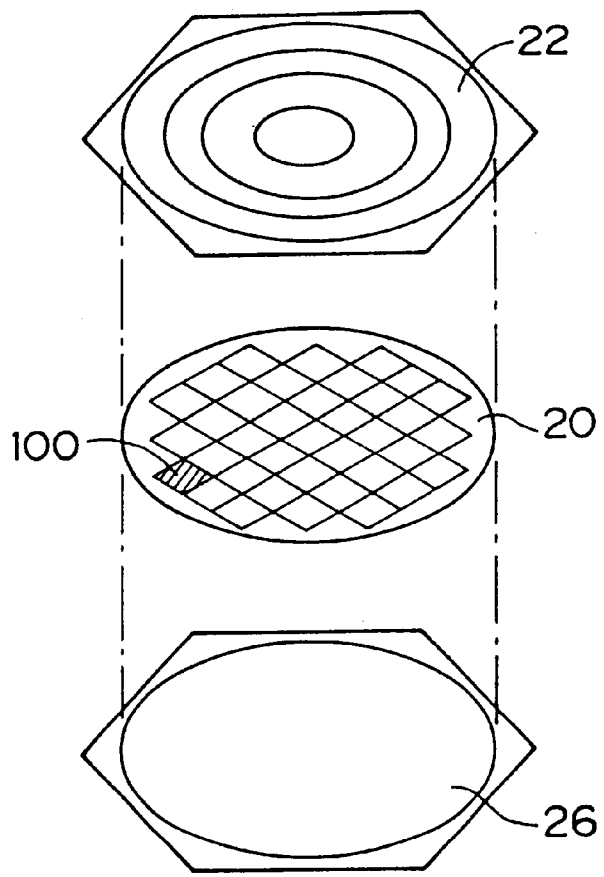
FIG. 2B is a schematic view showing the positional relationship between a data patch, a diffractive lens, and an LED.

FIG. 2A is a schematic view showing a structure of an optical memory card which is an OROM type information medium. FIG. 2B is a schematic view showing the positional relationship between a data patch, a diffractive lens, and an LED. An optical memory card 12 has on its surfaces a data layer 14 and a diffractive lens array layer 16. The data layer 14 comprises a recordable layer divided into data patches 20. Each patch is a 2D image containing 32 KB of data. About 5000 data patches 20 are provided in the data layer 14 of a single optical memory card 12. A single data patch 20 is formed to be divided into grid-like blocks 100. Each block 100 is a single unit. One bit of information is recorded by forming or not forming a pit at each of the units 100. The pit may be in a concave form or in a convex form. Information to be recorded are formed on a stamper. These information are transcription-molded, so as to record pits of a reproduce-only medium. The diffractive lens array layer 16 has a number of diffractive lenses 22 which number is the same number as the number of data patches 20. Each of the diffractive lenses 22 is provided so as to correspond to one of the data patches 20. A transparent region 18 through which a reproducing beam can pass is provided at the center of the optical memory card 12.

Referring to the optical memory card having the structure shown in FIGS. 2A and 2B, the principles of OROM data reproducing will be described.

Figure 3:
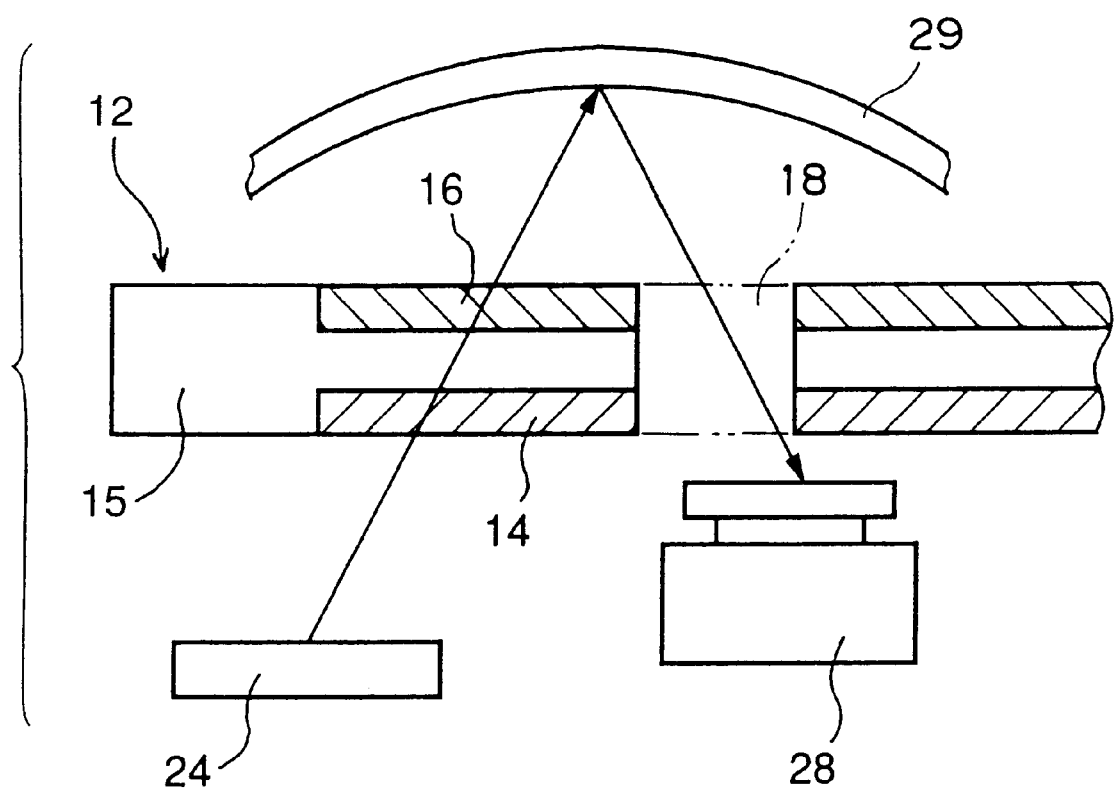
FIG. 3 is a conceptual view showing the reproducing principles of the OROM.

FIG. 3 is a conceptual view showing the principles data reproduction of the OROM.

In the optical disk device of the OROM, an LED array 24 is arranged in such a manner that the data layer 14 of the optical memory card 12 is positioned directly above the LED array 24 when the optical memory card 12 is inserted into the device. The LED array 24 has LEDs 26 of the same number as the number of data patches 20. Each of the LEDs 26 is provided so as to correspond to one of the data patches 20. A CMOS image sensor 28 is provided below the transparent region 18. Furthermore, a bowl-shaped refractive collecting lens 29 is disposed above the optical memory card 12.

In the case in which the recorded data of the optical memory card 12 are read, the LED 26 corresponding to the target data patch 20 is turned on so as to illuminate the data patch 20. The light which has passed through the data patch 20 is bent in a predetermined direction at the diffractive lens 22, and is reflected at the bowl-shaped reflective collecting lens 29. The reflected light passes through the transparent region 18 of the optical memory card 12, and reaches the CMOS image sensor 28 disposed below the transparent region 18. The data image of the data patch 20 is magnified and projected on the image sensor 28. The CMOS image sensor 28 reads this data as an image, and then the read image is converted to digital data. In this way, the recorded data is read out.

In order to make optical writing of information possible, it is necessary to add at least a recordable layer to the structure of the optical memory card which is an OROM information medium. In order to reproduce information in the aforementioned OROM type optical disk device, it is necessary to have a lens layer from the viewpoint of the reading principles of the OROM.

Furthermore, the OROM type optical disk device presupposes reproduction in a stationary state and reading by a CMOS image sensor. Thus, for reproduction of information in this device, it is desirable that information is recorded in each of the patches which have been divided into grid-like blocks.

Optical Information Medium

The optical information medium of the present invention has been designed so as to meet the aforementioned requirements.

Figure 1:
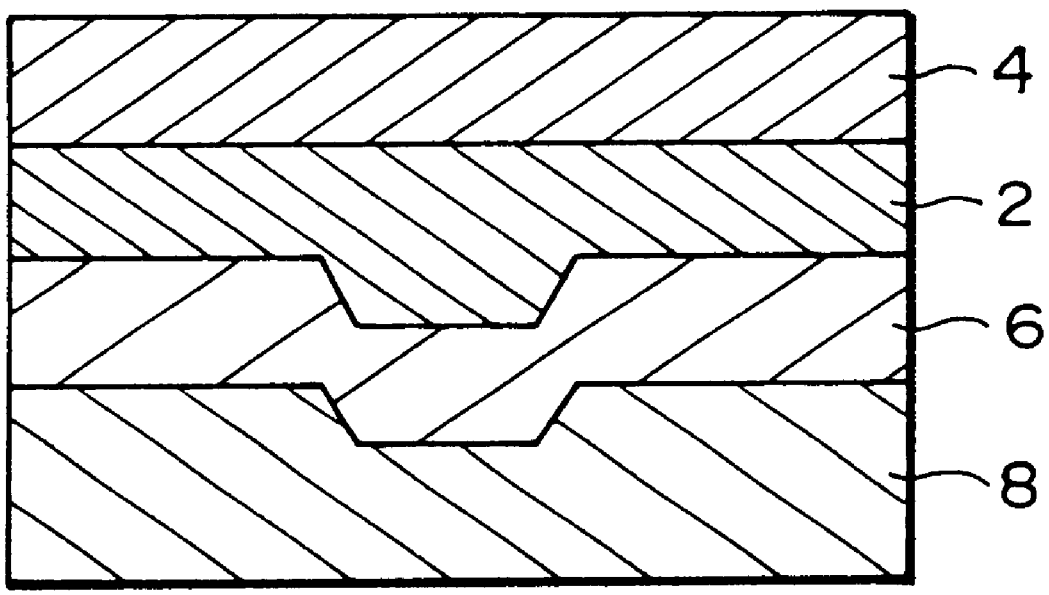
FIG. 1 is a schematic cross-sectional view showing an example of a layer structure of an optical information medium of the present invention.

FIG. 1 is a schematic cross-sectional view showing an example of a layer structure of the optical information medium of the present invention.

The optical information medium of the present invention has a substrate 2, a lens layer 4 provided on one surface of the substrate 2, and a recordable layer 6 provided on another surface of the substrate 2. A protective layer 8 is usually provided on the recordable layer 6. Plural lenses are provided in the lens layer 4 to optically read data of plural data patches by illuminating the data patches with light. A tracking guide for guiding the recording light is located at the interface between the substrate 2 and recordable layer 6.

Respective structural components of the optical information medium of the present invention will be described hereinafter.

(Substrate)

The substrate may be made of any material which can be used for substrates of conventional optical information media. Examples of the substrate material include glass; polycarbonate; acrylic resins such as poly(methyl methacrylate); vinyl chloride resins such as poly(vinyl chloride) and vinyl chloride copolymer; epoxy resins; amorphous polyolefin; and polyester. A combination of these materials may be used if desired. Among these materials, polycarbonate is preferable from the standpoints of moisture-resistance, size-stability and costs.

An undercoat layer may be provided between the substrate and the recordable layer to improve flatness and adhesion of the substrate and to prevent deterioration of the recordable layer. Examples of the material of the undercoat layer include polymers, such as poly(methyl methacrylate), acrylic acid-methacrylic acid copolymers, styrene-maleic anhydride copolymers, polyvinyl alcohol, N-(hydroxymethyl)acrylamide, styrene-vinyltoluene copolymers, chlorosulfonated polyethylene, nitrocellulose, poly(vinyl chloride), chlorinated polyolefin, polyester, polyimide, vinyl acetate-vinyl chloride copolymers, ethylene-vinyl acetate copolymers, polyethylene, polypropylene, and polycarbonate; and surface modifiers, such as silane coupling agents. The undercoat layer can be formed by dissolving or dispersing the aforementioned material into a suitable solvent to prepare a coating solution, and then applying this coating solution on the surface of the substrate by a coating method such as spin coating, dip coating, or extrusion coating. The thickness of the undercoat layer is usually in the range from 0.05 to 20 $\mu$m, and preferably in the range from 0.01 to 10 $\mu$m.

(Recordable Layer)

The recordable layer is not limited provided that it is a layer having the function that the transmittance of the reading light at the portion of the layer illuminated by a recording laser beam changes. The transmittance at the portion illuminated by the recording laser beam may increase or decrease. In other words, if the transmittance changes before and after the illumination by the recording laser beam, this change makes recording of information possible. Examples of the recordable layer include layers whose transmittance changes due to the following causes:

1) an increase or decrease in an light absorbance at the portion which is illuminated by the recording laser beam,
2) an increase or decrease in diffraction light or scattered light at the portion which is illuminated by the recording laser beam, and
3) a change in the polarizing angle at the portion which is illuminated by the recording laser beam. (In this case, the transmittance, which is measured through an analyzer after transmission, changes.)

The "information" referred to herein may be recorded as digital data or analog data. In the recording of digital data, more accurate recording can be carried out by applying a data restoring means, such as error corrector, in a subsequent step.

The mechanism by which the transmittance changes by a laser beam has been described above. However, it suffices to record information by changing the transmittance of the reading light, and the respective mechanisms therefor may be realized alone or in combination.

Preferably, the contrast generated when the transmittance changes should be greater. The contrast is the ratio of the transmittances before and after recording. It is calculated by using, among the transmittances before and after recording, the smaller one as a denominator.

It is not necessary for the wavelength of the laser beam which is the recording light to be equal to that of the reading light. It suffices that the transmittance of the reading light changes. The transmittance of the recording light may or may not change. However, in a case in which recording is carried out over several times, it is preferred that the transmittance of the recording light changes because if a recording device can recognize the contents of the area recorded in the previous steps, recording in areas following that recorded area is easier.

Specifically, the recordable layer is preferably any one of a dye-containing recording layer, a phase change recording layer and a magneto-optical recording layer. A dye-containing recording layer or a phase change recording layer is preferable for making the transmission optical system simpler. The dye-containing recording layer is the most preferable for making the contrast greater.

A material which is used for a dye-containing recordable layer of write-once type optical disk can be used as the dye-containing material for the recordable layer.

The dye absorbs the recording light and changes the light into heat. The decomposition, vaporization or sublimation of the dye by this heat causes the absorption of the light to decrease. In this way, the dye contributes to the change in the transmittance. It is also possible to use a dye which itself does not chemically change, but by which the transmittance changes due to deformation. Such deformation includes the phenomenon that pits are formed by volume contraction or the like, as well as the phenomenon that the substantial optical thickness changes due to volume expansion or the like and thus the transmittance changes due to optical interference with the surrounding regions.

In order to obtain such effects, it is preferred that the material contains dye in an amount of 5% or more.

Examples of the materials other than the dye which are contained in the recordable layer are a binder, an anti-fading agent, an adhesion promoter, an optical adjuster and the like.

The binder is a material which functions to improve the strength of the layer. Examples of the binder include natural organic polymers such as gelatin, cellulose derivatives, dextrin, rosin, and rubber; and synthetic organic polymers, for example, hydrocarbon resins such as polyurethane, polyethylene, polypropylene, polystyrene and polyisobutylene, vinyl resins such as poly(vinyl chloride), poly(vinylidene chloride) and vinylchloride-vinyl acetate copolymers, acrylic resins such as poly(methyl acrylate) and poly(methyl methacrylate), and polyvinyl alcohol, chlorinated polyethylene, epoxy resins, butyral resins, rubber derivatives, and initial condensates of thermosetting resins such as phenol-formaldehyde resin. In the case in which the binder is also used as the material of the recordable layer, the amount of the binder used is in the range from 0.2 to 20 parts by weight, preferably from 0.5 to 10 parts by weight and more preferably from 1 to 5 parts by weight per 100 parts by weight of the dye.

The anti-fading agent may be a singlet oxygen quencher, an antioxidant, an oxidizing agent or the like. The adhesion promoter is a material which functions to improve the adhesion of the recordable layer to another layer or to the substrate. The optical adjuster is a material for increasing or decreasing the transmittance as preferred at the time of reading, for augmenting the change in the transmittance by the laser beam at the time of recording, and for adjusting the refractive index of the recordable layer.

Rewritable materials may be used as the dye-containing material. Examples of such materials include photochromic materials whose color is changed by irradiation with light. Examples of the photochromic materials include crystals wherein a color center is used, such as $CaF_2$, NaF, KCl, and $CaTiO_3$ doped with Ca, Na, Ni, Mo, Al or the like, glass containing silver ions, and organic photochromic materials such as stilbene, spiropyrane, and salicylidene aniline.

The phase transition material, wherein a change in its phase state is induced by irradiation with light, may be chalcogenide wherein a reversible change in phase between non-crystal and crystal is caused according to the wavelength of the irradiated light.

Examples of materials wherein a magneto-optical effect is used include MnBi, MnGaGe, PtCo, GdIG, CdCo, $CrO_2$, Co—P, and the like.

A metallic layer, such as a thin silver layer deposited by a DC sputtering method, may be formed between the recordable layer and the protective layer for the purpose of obtaining sufficient refractive light in a tracking detector and for the purpose of protecting the dye from the protective layer provided on the recordable layer.

(Tracking of the Recordable Layer)

The recording density of the data medium is preferably high. In the case of optical recording, in principle, the recording density can be raised up to the level of the wavelength of light. In this case, the pitch of the recorded lines is about 1 $\mu$m. On the other hand, when two-dimensional scanning is carry out, it is difficult for the scanning pitch of the recording device to be about 1 $\mu$m. Therefore, it is preferred that a scanning guide means is provided at the recordable layer and that the light source is equipped with a means which causes the laser beam to follow this guide means. Examples of the method following include a push-pull method, a three beam method, and a phase difference method.

For the optical information recording material of the present invention, it is preferred that tracking for guiding the laser beam is carried out at the time of recording. It is also preferred that the recordable layer is equipped with a tracking guide, for example, tracking grooves, or prepits representing information such as address signals.

The tracking may be land tracking, groove tracking, land/groove tracking, or land/groove boundary tracking. Land tracking or groove tracking is preferable. Groove tracking is most preferable. Moreover, tracking may be carried out by using a sample servo. In this case, as the tracking guide, grooves are not formed, and rather, prepit rows are formed.

The optical depth of the tracking guide is preferably less than or equal to the wavelength of the recording light, more preferably ¾ or less than the wavelength, and most preferably, ½ or less than the wavelength. The lower limit of the optical depth is preferably 1/20 or more of the optically recording wavelength, and more preferably 1/10 or more of the optically recording wavelength. The optical depth can be determined by regarding, as reference surfaces, the interface portions having the largest reflectances in the land (the convex portion) and the groove (the concave portion), and then calculating the optical path lengths from the light source to the respective interfaces and the optical path length from the respective interfaces to, for example, a detector for tracking-signals at the time of recording. A value equal to one-half of the difference in the optical path lengths of the paths from the light source to the detector is the optical depth. Taking the refractive indexes into consideration, the optical path length in the medium is calculated as the product of the refractive index and the actual length. When the groove is too deep, light-loss based on scattering and diffraction becomes large such that the reflectance and transmittance may decrease. When the groove is too shallow, the amplitude of the tracking signals becomes small such that stable tracking cannot be carried out.

The width of the tracking guide is, in the case of groove tracking, the width of the groove, and is, in the case of land tracking, the width of the land. The width of the groove is considered to be the width as measured at a depth of one-half of the groove depth.

The width of the tracking guide is preferably ⅘ or less, more preferably ¾ or less, and most preferably ⅔ or less as long as the pitch of the tracking guide. The lower limit of the tracking guide width is preferably 1/10 or more, more preferably ⅕ or more, and most preferably ¼ or more as long as the tracking guide pitch. The width of the tracking guide is preferably two times or less, more preferably 1.5 times or less, and most preferably one time or less as wide as the width $1/e^2$ of the beam. If the width of the guide is too wide, the laser beam cannot follow, and the recorded pits meander.

The tracking guide can be formed in the same way as for general optical disks. For example, a desired tracking guide shape is made on a stamper, and then this stamper is used to carry out a molding step. In this way, the tracking guide can be formed on the recordable layer.

It is preferred that tracking at the time of recording is carried out by reflection. In the optical information medium of the present invention, lenses are disposed at the side of the substrate opposite to the side of the substrate at which the recording light is incident. Thus, in the case in which tracking is carried out by transmission, it is difficult for signals from the tracking guide to be caught accurately.

In the optical information medium of the present invention, recording can be carried out in such a manner that the data patches are formed so as to be divided into grid-like blocks by performing the recording in the form of concentric circles or the form of a spiral, as will be described later. (Both concentric circles and a spiral are called "concentric circles" hereinafter.) At the time of reproduction, the position is specified by using an XY coordinate system, and the information of the specified position is read out.

The tracking guide pitch which is the recording pitch is preferably the same as or smaller than the pitch of the blocks, which is the reproducing pitch. The tracking guide pitch is more preferably ¾ or less, and most preferably ½ or less as long as the pitch of the blocks. As the tracking guide pitch becomes smaller with respect to the pitch of the blocks, the record pits can be formed in orbitary positions more easily, and the pit position accuracy in the respective blocks is improves such that reproduction accuracy is also improved. However, if the tracking guide pitch is overly smaller than the wavelength of the laser which is the recording light, it may not be possible to carry out tracking stably. Thus, the lower limit of the tracking guide pitch is preferably ⅕ or more, and more preferably ½ or more as long as the wavelength of the laser which is the recording light.

In the case in which the pitch of the tracking guide which is to become the recording pitch is equal to or is smaller than the reproduction pitch, if synchronizing signals are inputted between adjacent tracks, position accuracy is improved at the time of mapping in the XY coordinate system, and thus recorded data can be recognized successfully at the time of reproduction. To this end, it is preferred that a mark corresponding to the XY coordinate system is applied as a tracking guide onto the substrate. The mark may be in the form of wobbles or prepits.

The mark for controlling linear velocity is preferably in the form of wobbles or prepits. If wobbles are applied, the tracking signals meander. If motor rotation is subjected to feed back control in such a manner that the frequency of the meandering is kept constant, it is possible to carry out accurate control for making the linear velocity or angular velocity constant. If wobbles having the same period are applied to inner circles and outer circles, the linear velocities are made constant at points at any radius. If the wobbles are applied in such a manner that their periods become longer in the direction from inner circles to outer circles, accurate control for constant angular velocity (CAV) can be carried out.

The same can be applied to the case of prepits. The above can be applied to the case of prepits if the "period of the wobbles" is substituted by the "interval of the prepits" in the above description. A combination of both of wobbles and prepits can be used.

(Lens Layer)

Plural lenses are arranged in the lens layer for optically reading respective data of plural data patches by illuminating the data patches with light. The lens may be any type of lens, for example, an ordinary concave lens, convex lens, holographic lens, aspheric surface lens, or the like. From the viewpoint of easy formation on the substrate at the time of molding, a diffractive lens is preferable.

The number of the lenses is preferably equal to (the size of the recording area/2 mm$^2$) or more, more preferably (the size of the recording area/1 mm$^2$) or more, and most preferably (the size of the recording area/0.2 mm$^2$), or more, in order for all of the data recorded on the information medium to be accurately read.

The form of the lenses is preferably in the form of Fresnel. The maximum depth of the Fresnel unevenness is preferably 1 mm or less, more preferably 0.5 mm or less, and most preferably 0.2 mm or less. If it is too deep, satisfactory transcription-formation cannot be carried out at the time of molding, so that poor formation occurs easily.

(Protective Layer)

It is preferred that a protective layer or a protective plate is provided on the surface of the recordable layer in order to protect the recordable layer and the like physically and chemically.

Examples of the material of the protective layer or protective plate include inorganic materials such as SiO, $SiO_2$, $MgF_2$, $SnO_2$, $Si_3N_4$; and organic materials such as thermoplastic resins, thermosetting resins and UV hardening resins.

If the information medium is not to be placed into a cartridge, it is preferable to provide a protective plate.

The protective plate is provided so as to be integral with the information medium. The protective plate is preferably bonded to the information medium by some method. The bonding is carried out at only the inner circle area, or only at the outer circle area, or at the inner circle and outer circle areas, or at the entire surface. The bonding may be realized by an adhesive agent or by an interlocking manner, and it is necessary that the protective plate does not come off of the information medium. In the case in which a protective plate is present, even if the plate is slightly scratched or damaged, there is hardly any effect at the time of focusing the laser beam.

The thickness of the protective plate is preferably 2 mm or less, more preferably 1 mm or less, and most preferably 0.6 mm or less. The lower limit of the thickness of the protective plate is preferably 0.1 mm or more, more preferably 0.2 mm or more, and most preferably 0.3 mm or more.

Preferably, a protective layer is provided in the case in which the information medium is to be placed in a cartridge.

The protective layer can be formed, for example, by laminating a film, which is obtained by extrusion-processing of a plastic, onto the recordable layer by an adhesive agent. Alternatively, the protective layer may be formed by a method such as vacuum vapor deposition, sputtering, coating, or the like. In the case of thermoplastic or thermosetting resins, the protective layer may be prepared by the resin being dissolved into a suitable solvent to prepare a coating solution, and then this coating solution being applied and dried. In the case of UV hardening resins, the protective layer may be made by preparing a coating solution without using any solvent or by preparing a coating solution by dissolving the resin in a suitable solvent, applying the coating solution, and then carrying out irradiation with UV lights to harden the coating. To these coating solutions, various additives such as antistatic agents, antioxidants, UV absorbers and the like may be added for a desired purposes.

The thickness of the protective layer is preferably 1 $\mu$m or more, and more preferably 5 $\mu$m or more. The upper limit of the thickness of the protective layer is preferably 100 $\mu$m or less, more preferably 60 $\mu$m or less, and most preferably 20 $\mu$m or less. If the protective layer is too thin, if may not be possible to exhibit a sufficient protective function. If the protective layer is too thick, there is much contraction at the time of forming the layer, and thus the information medium may be warped.

The reflectance of the recording light on the optical information medium of the present invention is preferably 10% or more, more preferably 20% or more, and most preferably 30% or more, about the central wavelength of the recording light. The upper limit of the reflectance of the recording light is preferably 90% or less, and more preferably 70% or less, and most preferably 50% or less. If the reflectance is too low, sufficient tracking signals cannot be obtained, so that tracking may become unstable. If the reflectance is too high, sufficient light absorption or heat conversion cannot occur in the recordable layer, so that the recording sensitivity may decrease.

In order to make it possible to carry out the reproduction of the optical information medium of the present invention by transmission light, it is preferred that the transmittance of the reproducing light is high. The transmission light for reproduction is not limited to a single wavelength such as a laser beam for reproduction as in the conventional art, but also light having a spectrum with some width can be used. In the case that the light having a spectrum with some width is used, the transmittance of the reproducing light at the central wavelength of this spectrum is preferably 10% or more, more preferably 30% or more, and most preferably 50% or more.

Since, for example, the CMOS used as the detector has a sensitivity spectrum, it is most preferable that the transmittance of the light having the peak wavelength of a practical spectrum, which is the product of the reproducing light spectrum and the detector sensitivity spectrum, falls into the above range.

The transmittance referred to herein is the transmittance at the recording area, whose transmittance is high.

When the optical information medium of the present invention is rotated and driven to carry out recording and reproduction, it is preferable to provide a means for setting the rotation center for the rotational driving.

As the means for setting the rotation center, either providing a chucking member at the center or providing a chucking member at the periphery may be adopted. In the case in which the chucking means is provided at the center, a concave and convex fitting manner is preferable. For the concave and convex fitting manner, a method is adopted in which a central hole is formed and a spindle is inserted into this hole at the time of recording, or a method is adopted in which a hub is formed at the center of the medium and a chuck corresponding to this hub is disposed at the recording device. The concave and convex fitting manner is also preferable, in the case in which the chucking means is provided at the periphery. A form in which a concave member receives the edge face of the periphery is preferable. Regardless of which of these manners is adopted, it is necessary that the fit-together concave and convex portions are formed with sufficient accuracy so as to positioned to correspond to the center of the tracking guide. If the accuracy is insufficient, satisfactory tracking cannot be carried out when the substrate is rotated. The distance between the center of the concave portion or convex portion provided at the chucking member at the substrate and the center of the tracking guide is defined as the eccentricity. This eccentricity is preferably 500 $\mu$m or less, more preferably 200 $\mu$m or less, and most preferably 100 $\mu$m or less.

Moreover, it is preferred that the concave portion and convex portion have as few burrs as possible. The largest height of the burrs is 200 $\mu$m or less, preferably 100 $\mu$m or less, and most preferably 50 $\mu$m or less. The form of the chucking may be such that the concave portion and the convex portion are fitted to each other over the entire circumference of the disk or at parts thereof. It is also preferred that one or both of the concave portion and the convex portion are tapered. When one or both are tapered, a tighter fit can be achieved and play between the members can be absorbed so that the position of the center can be accurately decided.

When the substrate is not disk, it is preferable to carry out an unbalance correction.

Examples of the method of unbalance correction include a method of providing a structure for offsetting an amount of unbalance of the medium, such as a weight for unbalance correction.

In order to project data on the detector, such as a CMOS image sensor, which is arranged below the optical information medium of the present invention, it is preferred that a region through which the reproduction light passes is provided at the central portion of the medium. This region is preferably a region through which the reproduction light can pass sufficiently. The transmittance of the reproduction light at this region is preferably 30% or more, more preferably 50% or more, and most preferably 70% or more. It is not necessary for the transmittance to be high over the entire visible light range. It suffices that the transmittance of the peak wavelength of the practical spectrum satisfies the aforementioned range.

Optical Information Recording Method and Optical Reproducing Method

Figure 4:
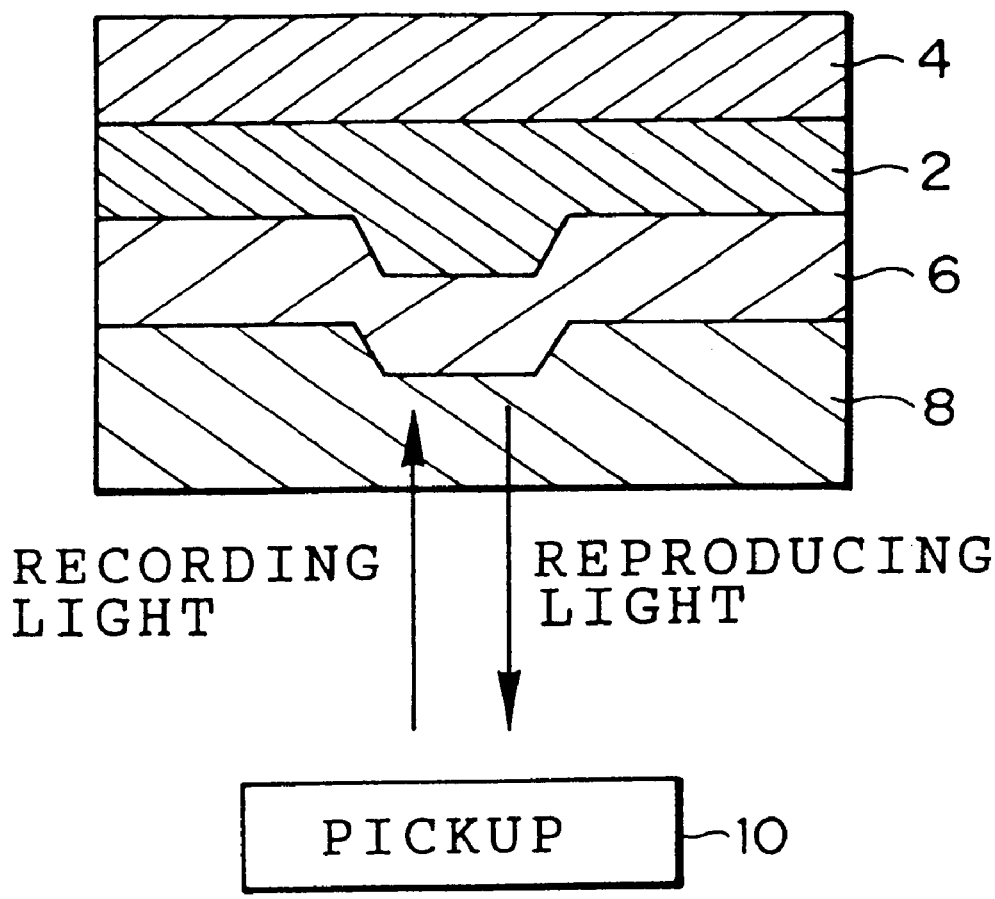
FIG. 4 is a conceptual view for explaining the recording method for recording information on the optical information medium, according to the present invention.

As shown in FIG. 4, in the optical information medium of the present invention, recording light is irradiated toward the substrate 2, from the side of the recordable layer 6, by means of a pickup 10 so that data can be recorded onto the recordable layer 6. At the time of recording, it is preferred that the light reflected from the recordable layer 6 is detected by a tracking controlling detector built-in within the pickup 10 so that tracking is controlled.

Methods of carrying out two-dimensional recording by using a laser beam include the XY plotting method and the concentric (or spiral) plotting method. The optical information medium of the present invention can be applied to either of these methods.

The XY plotting method is a method of moving the information medium or the light source along rectangular coordinates to carry out two-dimensional recording. When the information medium is moved along the X direction and the light source is moved along the Y direction, recording in different combinations of forms can be realized. In order to move the medium or the light source, it is possible to use a linear motion actuator such as a linearly moving stage or a cylinder. As for the light source, it is possible to move only the recording light by a polygon mirror or a scanning mirror disposed on the light path.

The concentric plotting method is a method of rotating the medium and moving the light source in the radial direction to carry out two-dimensional recording. The light source may be moved one pitch by one pitch after the medium makes one revolution (in a concentric form), or the light source may be moved by one pitch or by plural pitches whenever the medium makes one revolution, so that recording is performed in a spiral manner. The plural-pitch-method is a method of putting spaces between the recording spirals and subsequently carrying out recording in the spaces. At the time of concentric (or spiral) recording, it is also possible to rotate the information medium and simultaneously move the light source in the radial direction so as to carry out a recording. Also, it is possible to move only the light source, thereby performing recording by scanning of light.

In the case of reproduction in the OROM type optical disk recording device, recorded data are read as image data by the CMOS image sensor, and then are digitized. In this CMOS sensor, elements are generally alignd on XY coordinates, which cross each other at right angles. Therefore, data recording is preferably carried out by the XY plotting method in such a manner that the respective data units are aligned on the XY coordinates, that is, the respective patches are formed so as to be divided into grid-like blocks as units.

However, from the standpoint of performing recording position control more accurately, it is preferable to perform recording by the concentric plotting method. In order to scan recording light in the XY direction according to the XY plotting method, it is necessary to provide an accurate positioning device at the recording device. However, an XY positioning device has a complicated structure and its positioning speed is slow. On the other hand, in the case of the concentric plotting method, when the aforementioned tracking controlling method and rotation controlling method using the wobbles are used, positioning can be carried out accurately without using any complicated devices, and further, the positioning speed is fast.

In the optical information medium of the present invention, even if recording is carried out by the concentric plotting method, recording can be realized in a recording form in which the respective patches are divided into grid-like blocks.

That is, by making the recording pitches at the time of concentric recording equal to or smaller than the reproduction pitches, recording can be realized in the form in which the respective patches are divided into grid-like blocks and further, reproduction can be realized with no problem.

The tracking guide pitch, which is the recording pitch, is preferably equal to or shorter than the pitch of the respective blocks (the length of each side of each block), which is the reproduction pitch. The tracking guide pitch is more preferably ¾ or less, and most preferably ½ or less as long as the pitch of the respective blocks.

Figure 5:
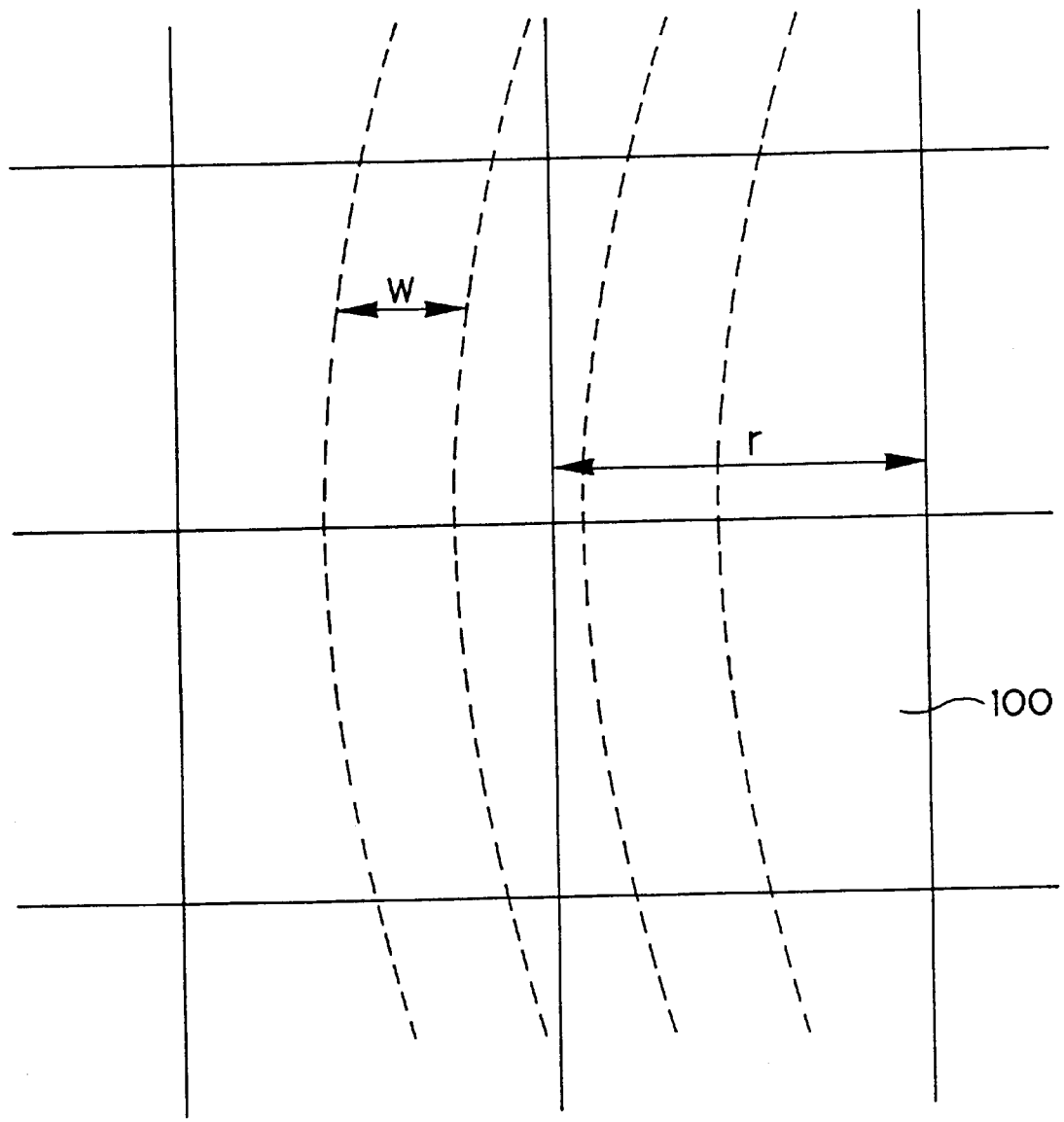
FIG. 5 is a schematic view for explaining the relationship between recording pitches and reproduction pitches.

This situation will be described with reference to FIG. 5. FIG. 5 is a schematic view for explaining the relationship between the recording pitches and the reproduction pitches. If the recording pitch w is equal to or smaller than the reproduction pitch r, reproduction can be carried out with no problems even in OROM type optical disk recording devices. The smaller the recording pitch w with respect to the reproduction pitch r, the greater the improvement in reproduction accuracy.

In order to improve accuracy of reading images, it is preferable that when the pitch of reproduced image pixels, at the time of projecting the information recording portion onto a reproduction element such as a CMOS, is compared with the pitch of the reproduction element, the pitch of the reproduction element is equal to or narrower than the pitch of the reproduced image pixels.

In this case, accuracy comes into question. However, sufficient accuracy can be obtained by disposing a tracking guide on the recordable layer of the optical information medium as described above.

The optical information medium of the present invention, by a single beam such as a laser,makes it possible to carry out reproduction by tracking signals recorded as a track extending in a spiral shape on the rotary disk, in the same manner as in conventional optical disk devices. In particular, the optical information medium of the present invention is characterized in that reproduction can be carried out by OROM type optical disk devices as well.

Recorded information can be reproduced by illuminating the optical information medium of the present invention, from its recordable layer side, with reproducing light and reading the transmitted light. For example, recorded information can be reproduced by illuminating respective data patches, which are recorded on the optical information medium of the invention, with light from a reproduction light source such as an LED to cause the light to pass (be transmitted) through the lenses, reading the transmitted light as images by the CMOS image sensor, digitizing the read images, and extracting the recorded data.

As the transmission light for reproduction, it is more preferable to use light having a spectrum with some width, such as light from an LED, rather than light of a single wavelength, such as a laser beam, which has been used conventionally.

In the case in which a dye-containing recordable layer is used, there is the fear that the dye may be faded by the light for reproduction. Thus, it is preferred that the spectrum peak of the reproducing light is set be different than the absorption peak of the dye. Moreover, setting these peaks to differ from one another results in an improvement in the transmittance of reproduction light.

Considering only the reproduction sensitivity contrast is made higher, by making these two peaks coincide. However, as described above, in the case in which there is the fear of fading, it is preferred that the spectrum peak of the reproducing light is set to be different than the absorption peak of the dye. The peaks are set to be different than each other preferably by a wavelength difference of 10 nm or more, more preferably by 50 nm or more, and most preferably by 100 nm or more. However, in consideration of the decrease in contrast, the wavelength difference between the spectrum peak of the reproducing light and the absorption peak of the dye is preferably, at most, 300 nm or less, more preferably 200 nm or less, and most preferably 150 nm or less.

EXAMPLES

An example of the present invention will be described hereinafter in detail.

Example 1

A lens layer was formed from a UV light hardening resin on the surface opposite to a groove surface of a polycarbonate substrate (diameter: 120 mm, thickness: 1.2 mm, diameter of the central hole: 15 mm, "Panlight AD5503" manufactured by Teijin Ltd.) in which a spiral groove (track pitch: 1.6 μm, groove width: 1.1 μm, and groove depth: 0.18 μm) was formed by injection-molding on the groove surface.

A coating solution, in which 2.7 g of the dye having the following structure was dissolved into 100 ml of TFP (tetrafluoropropanol), was applied onto this substrate by a spin coating method, while the rotational speed was varied from 300 rpm to 4000 rpm, so that the thickness of the coating on the groove was 0.1 μm and the thickness on the land was 0.2 μm. The coating was then dried to form a dye-containing recordable layer. In this example, portions in a convex form, as viewed from the surface at which the laser was incident, are referred to as the grooves.

OM-76

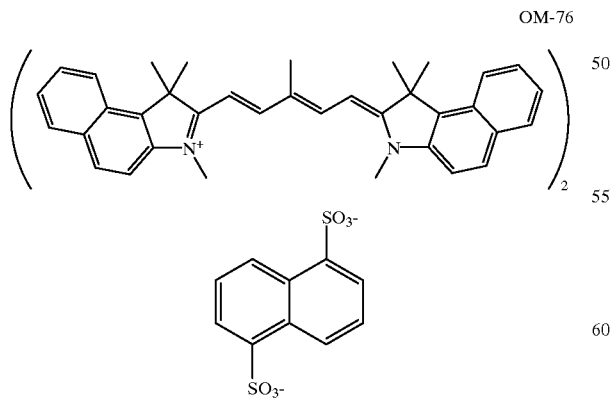

Next, a metal layer formed of a thin silver film of 10 nm thickness was formed on the dye recordable layer by a DC sputtering method. After this metal layer was formed, a UV light hardening resin "SD318" (manufactured by Dainippon Ink & Chemicals, Inc.) was coated thereon by a spin coating method, and then UV lights were irradiated thereon from a high pressure mercury light from above so as to harden the resin, and a protective layer of 8 μm thickness was thus formed. In this way, the optical information medium of the present invention was obtained. To obtain sufficient transmittance at the central portion of the medium, the dye recordable layer, the metal layer and the protective layer were formed at only the portion outside of a radius of 20 mm.

Figure 6:
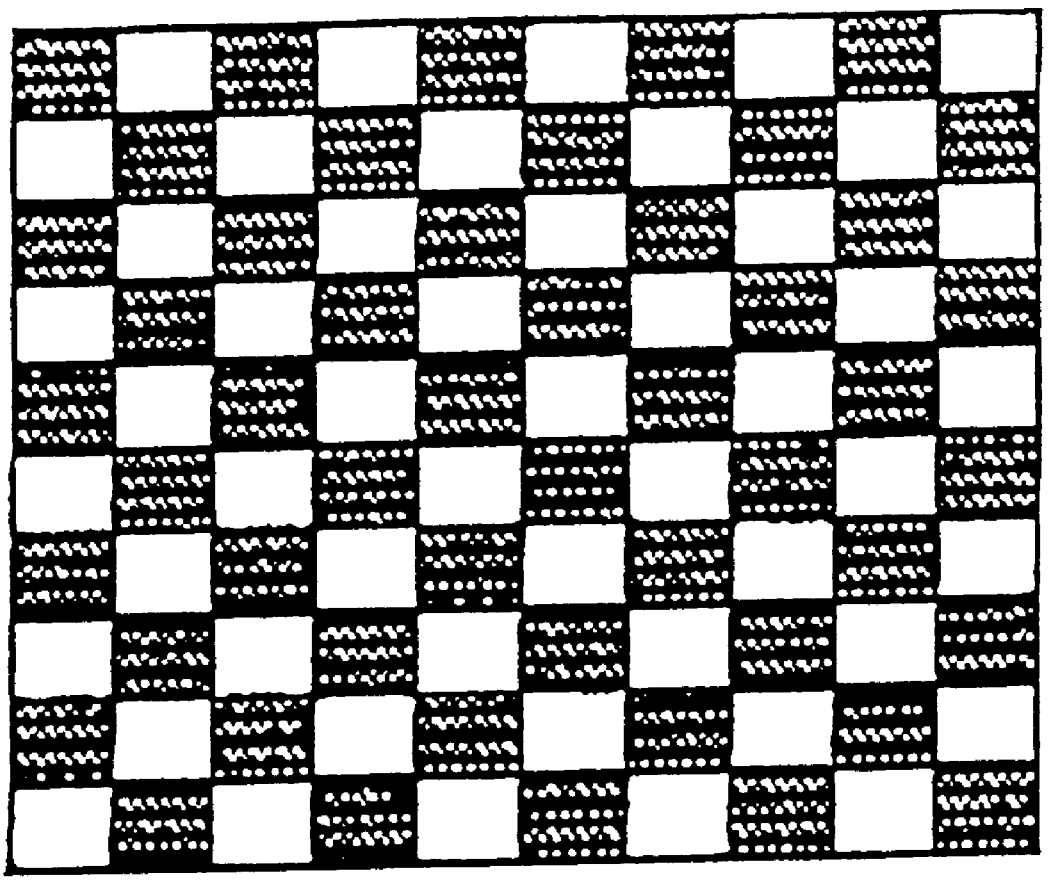
FIG. 6 is a schematic view illustrating a recorded state formed by being divided into grid-like blocks.

Using "DDU1000" device manufactured by Palstic Ltd., pits were formed by a laser beam having a wavelength of 781 nm on the obtained optical information medium at a linear velocity of 1.2 m/s, which linear velocity was controlled by using wobbles. When the medium made one revolution for writing, linear pits of about 1 μm width were intermittently formed at arbitary angles. This was repeated for the next track and further for the next track. Thus, patches divided into grid-like blocks were formed, wherein each block was about 0.1 mm square and was formed from a dot-shaped pit, as shown in FIG. 6.

Figure 7:
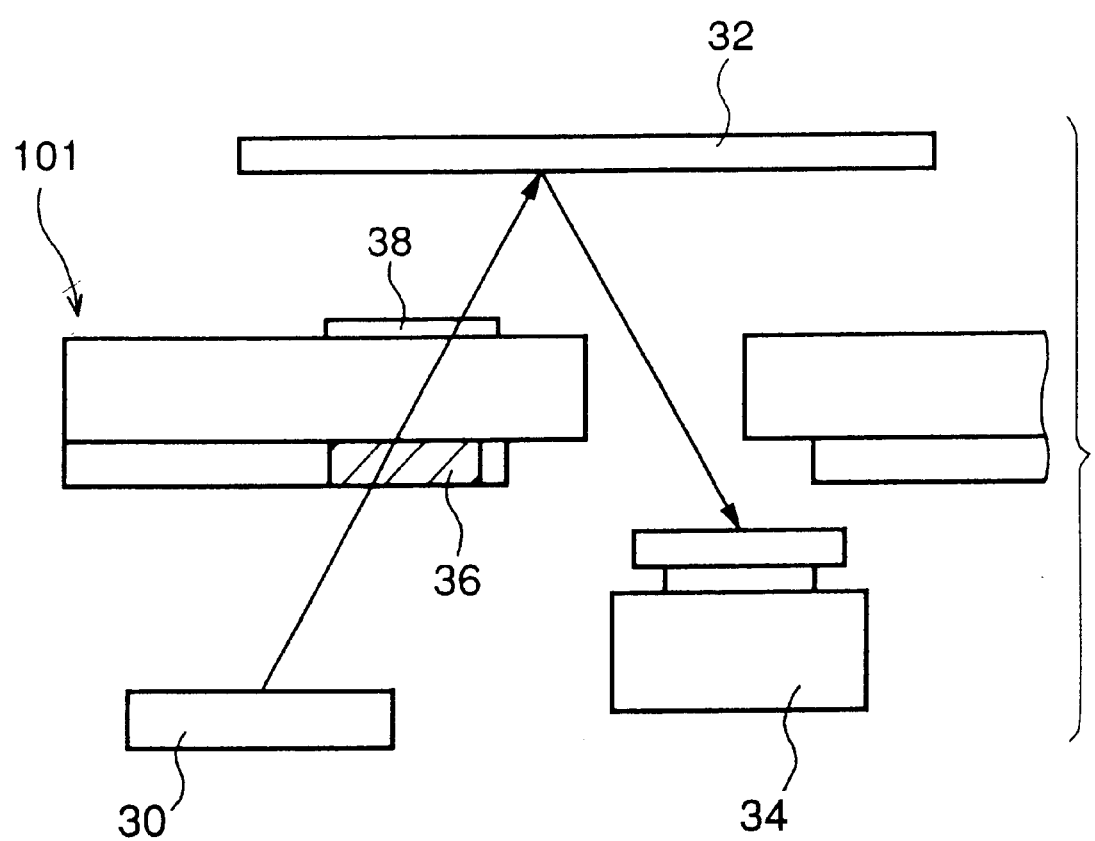
FIG. 7 is a schematic cross-sectional view illustrating a reproducing device used in an embodiment.

A reproduction device shown in FIG. 7 was used to observe this recorded optical information medium. The reproduction device shown in FIG. 7 include an LED 30, a reflective mirror 32 and a CCD camera 34. The recorded optical information medium 101 was set at the device, and then a position corresponding to a recording area 36 was illuminated, from below, by light from the LED 30. The light passed through a lens 38 disposed at a position corresponding to the recording area 36, and the transmitted light was reflected at the reflective mirror 32 disposed above the medium to pass through a hole formed in the center of the medium, and received this light with the CCD camera 34. It was possible to distinguish the presence or the absence of a record dot for each of the blocks and obtain an image having sufficient resolution.

In accordance with the present invention, a new optical information medium is provided which makes it possible to write information optically for rapid debugging or rapid production of a small number of media for small amounts of publication, and makes it possible to reproduce the information not only by conventional rotation type optical disk devices but also by OROMs which are next generation optical disk devices. The present invention also provides an optical information recording method and an optical information reproducing method which utilize the optical information medium.

What is claimed is:

1. An optical information medium comprising:
    a substrate;
    a recordable layer which is formed on one surface of the substrate and which has plural data patches; and
    a lens layer which is formed on another surface of the substrate and comprises the plural lenses for optically reading of respective data of plural data patches when the data patches are illuminated with light.

2. An optical information medium according to claim 1, wherein a tracking guide is provided at the recordable layer, and recording is carried out by the tracking guide such that the data patches are formed in a manner such that the data patches are divided into grid-like blocks.

3. An optical information medium according to claim 2, wherein a means for specifying addresses of the respective blocks is provided on the tracking guide.

4. An optical information medium according to claim 2, wherein a pitch of the tracking guide is equal to or smaller than a pitch of the respective blocks.

5. An optical information medium according to claim 2, wherein the shape of the tracking guide is concentric circles or a spiral shape.

6. An optical information medium according to claim 2, wherein the optical depth of the tracking guide is equal to or smaller than the wavelength of a recording light.

7. An optical information medium according to claim 2, wherein the width of the tracking guide is ⅕ or less than the pitch of the tracking guide.

8. An optical information medium according to claim 2, wherein a means for controlling a recording linear velocity is provided on a tracking guide.

9. An optical information medium according to claim 1, wherein one of a protective layer and a protective plate is provided on a surface of the recordable layer.

10. An optical information medium according to claim 1, wherein a means for setting a rotation center for rotation-driving is provided.

11. An optical information medium according to claim 1, wherein when reproducing light is irradiated from the recordable layer side, transmittance of the reproducing light is 10% or more.

12. An optical information medium according to claim 1, wherein when a recording light is irradiated from the recordable layer side, reflectance of the recording light is 10% or more.

13. An optical information medium according to claim 1, wherein a region through which reproducing light can pass is provided.

14. An optical information recording method comprising the step of irradiating, with recording light, an optical information medium comprising a substrate, a recordable layer which is formed on one surface of the substrate and which has plural data patches, and a lens layer which is formed on another surface of the substrate and comprises the plural lenses for optically reading of respective data of plural data patches when the data patches are illuminated with light, from the recordable layer side so as to record information on the recordable layer.

15. An optical information recording method according to claim 14, wherein a tracking guide is provided at the recordable layer, and recording is carried out by the tracking guide such that the data patches are formed to be divided into grid-like blocks.

16. An optical information recording method according to claim 15, wherein recording is carried out in concentric circles or in a spiral form in correspondence with the tracking guide.

17. An optical information recording method according to claim 14, wherein while the optical information medium is rotation-driven, recording light is irradiated from the recordable layer side, to record data on the recordable layer.

18. An optical information reproducing method comprising the step of irradiating, with reproducing light, an optical information medium comprising a substrate, a recordable layer which is formed on one surface of the substrate and which has plural data patches, and a lens layer which is formed on another surface of the substrate and comprises the plural lenses for optically reading of respective data of plural data patches when the data patches are illuminated with light, from the recordable layer side; and reproducing recorded information by reading transmitted light.

19. An optical information reproducing method according to claim 18, wherein a tracking guide is provided at the recordable layer, and recording is carried out by the tracking guide such that the data patches are formed to be divided into grid-like blocks.

20. An optical information reproducing method according to claim 19, wherein a means for specifying addresses is provided on the tracking guide, and the address specifying means specifies addresses of the respective blocks, and information of blocks whose addresses are specified is reproduced.

* * * * *